United States Patent [19]

Skinner

[11] 4,145,161

[45] Mar. 20, 1979

[54] SPEED CONTROL

[75] Inventor: David R. Skinner, Odessa, Tex.

[73] Assignee: Standard Oil Company (Indiana), Chicago, Ill.

[21] Appl. No.: 823,292

[22] Filed: Aug. 10, 1977

[51] Int. Cl.² .............................................. F04B 49/00
[52] U.S. Cl. ...................................... 417/22; 417/45; 417/53
[58] Field of Search .............................. 417/42, 22, 53

[56] References Cited

U.S. PATENT DOCUMENTS

| | | | |
|---|---|---|---|
| 3,334,285 | 8/1967 | Blake | 417/45 |
| 3,847,507 | 11/1974 | Sakiyama | 417/45 |
| 3,985,467 | 10/1976 | Lefferson | 417/45 |
| 4,024,864 | 5/1977 | Davies | 417/45 |

Primary Examiner—William L. Freeh

Attorney, Agent, or Firm—Arthur McIlroy

[57] ABSTRACT

This is a method and apparatus for controlling an oil-well beam pumping unit in a manner which allows increased oil production. The AC electric motor of the beam pumping unit is supplied power through a variable frequency power supply, whose frequency (and voltage) is controlled by circuitry to automatically adjust to whatever flow enters the wellbore by varying the speed of the pumping unit to maintain the speed generally proportional to the real power consumed by the pump. As the level in the wellbore can be maintained at an essentially constant minimum level, despite the relatively large hour-to-hour variations in in-flow which normally occur, the total flow from the formation into the wellbore in a given period of time is increased.

5 Claims, 3 Drawing Figures

SPEED CONTROL

CROSS-REFERENCE TO RELATED APPLICATION

Application Ser. No. 724,037, now U.S. Pat. No. 4,076,457, entitled "Downhole Pump Speed Control," filed Sept. 17, 1976, by Skinner, Sowell, and Justus, describes a control system for a hydraulic pumping unit which uses two fluid-flow metering means and controls the flow rate to the down-hole pump, to cause the power fluid flow rate to be maintained essentially directly proportional to the rate of return fluid flow from the well. The power fluid flow rate is thus not varied to maintain any of the fluid flows constant, but, conversely, changes the power fluid flow rate in the same manner in which the return fluid flow has changed.

Application Ser. No. 753,745, now U.S. Pat. No. 4,066,123 entitled "Hydraulic Pumping Unit with a Variable-Speed Triplex Pump," filed Dec. 23, 1976, by Skinner, Sowell, and Justus, describes a hydraulic pumping unit in which a cyclone feed pump and a flowback line are used to provide proper cleaning of the power fluid despite substantial changes in system flow rates. This allows the speed of the above-ground pump to be changed and provides substantial reduction in the cost of power for the prime mover (typically an electric motor).

Both of these co-pending applications vary the speed of a hydraulically actuated down-hole pump as a function of well conditions and both have embodiments using a variable frequency power supply. Both of these co-pending applications are for hydraulic pumping units, as opposed to the beam pumping units of this application (beam pumps mechanically actuate the down-hole pump by means of a polished rod and rod string).

BACKGROUND OF THE INVENTION

This invention relates to beam pumping units driven by an AC motor for pumping oil-well fluids, and more particularly to variable speed pumping to control pumping and increase oil production.

Beam pumping units are the predominant type of pumping units used in oil fields today. These units are generally controlled in a ON/OFF manner. That is, the pump is driven at an essentially constant speed by an AC motor until the well is "pumped off", i.e., there is some indication that there is insufficient fluid in the well for effective pumping, at which time the pump is stopped for some predetermined period. Typically, the pumped-off condition is determined by analyzing the load (force) on the polished rod or the current in the motor during some portion of the pump stroke. U.S. Pat. Nos. 3,817,094 and 3,838,597, issued to Montgomery and Stoltz and U.S. Pat. No. 3,015,469, issued to Womack and Jahns are typical of the polish-rod load monitoring type of controllers. U.S. Pat. No. 3,998,568, issued to Hynd and, U.S. Pat. No. 3,015,469, issued to Womack and Jahns are typical of the polish-rod load monitoring type of controllers. U.S. Pat. No. 3,998,568, issued to Hynd and U.S. Pat. No. 3,953,777, issued to McKee, are typical of the motor-current monitoring type of controller.

A number of controllers have been proposed in which the ON/OFF cycle is to be varied to increase effective production, including, for example, U.S. Pat. No. 3,610,779, issued to Hubby, and U.S. Pat. No. 3,559,731, issued to Stafford. True optimization is, of course, impossible in such ON/OFF control. Very fast cycling to approach the optimum generally draws excessive current and is impractical.

Down-hole pumps have been driven at variable speed. Hydraulic pumping units generally vary the speed of the down-hole pump by varying the flow of power fluid to the down-hole pump. U.S. Pat. No. 3,568,771, issued to Vincent and Drake on Mar. 9, 1971, describes a submersible electric pump supplied by a variable frequency power supply where the speed of the pump is varied to allow effective pumping of foamy crude.

Systems for variable-speed beam pumping units using hydraulic pistons or variable speed (DC) motors to actuate the beam have been proposed. Systems of variable-stroke length beam pumping units have also been proposed (see, for example, U.S. Pat. No. 2,958,237, issued Nov. 1, 1960, to Johnson). While other types of pumping units commonly used variable capacity down-hole pumps, beam pumping units have generally used ON/OFF control as ON/OFF controllers have been the least expensive and easiest to maintain.

SUMMARY OF THE INVENTION

The present invention is a method and apparatus for controlling and generally increasing well production. It uses a variable frequency power supply to vary the speed of a beam pumping unit and maintains the speed generally proportional to the real power supplied to the pump. The rod string of a beam pumping unit acts as a spring, and the rod string dynamics vary significantly as the speed is changed. Most of the system characteristics (including load on the polish rod and motor current) vary with changes which do not affect the pump, but are due, instead, to the rod string. These rod-string changes are principally in reactive effects (sometimes called reactive "power"). This invention is insensitive to these reactive changes, but responds instead to changes in real power. The pump efficiency in a given well has been found to vary principally with the depth of oil in the well. As efficiency can be expressed as the amount of oil pumped per unit time divided by the real power input, and as the amount of oil pumped by a beam pumping unit is generally directly proportional to the speed, maintaining the speed proportional to the real power maintains the level in the well generally constant. When this level is held at the practical minimum, in-flow from the formation and oil production are maximized.

Thus, for example, if the in-flow increases from natural causes, the level in the well rises and pump efficiency increases. This control system then increases the speed of the pump to accommodate the increased in-flow.

This variable pumping speed control system is for a beam pumping unit of the type in which a pump is actuated by a rod string which is in turn actuated by an AC induction motor. This system uses means for generating a signal indicative of the real power supplied to the pump and means for generating a second signal which is a function of pumping speed. Controller circuitry sensitive to the real power signal and the speed signal controls a variable frequency power supply, which supplies the power to the AC motor. Varying the output frequency (and voltage) of the variable frequency power supply varies the speed of the AC motor and thereby the speed of the pump. The speed of the pump is maintained essentially directly proportional to the real power supplied to the pump.

BRIEF DESCRIPTION OF THE DRAWINGS

A better understanding of the invention may be obtained by reference to the following drawings in which.

DESCRIPTION OF THE PREFERRED EMBODIMENTS

It has been found that the maximum practical production from any particular well varies significantly on an hour-to-hour and day-to-day basis. These variations are especially wide when the field is being waterflooded. Pumping the well continuously provides greater production than intermediate pumping. Thus, for maximum production the control system must be one which allows both for pumping continuously and for varying pumping speed to compensate for the natural changes of flow into the wellbore.

When the pumping speed is varied, however, the rod string dynamics vary and the system cannot be accurately controlled by variables, such as polish-rod load and motor current (even if voltage is constant or compensated for), because, as noted above, these variables are affected by the reactive effects introduced by rod dynamics.

Figure 1:
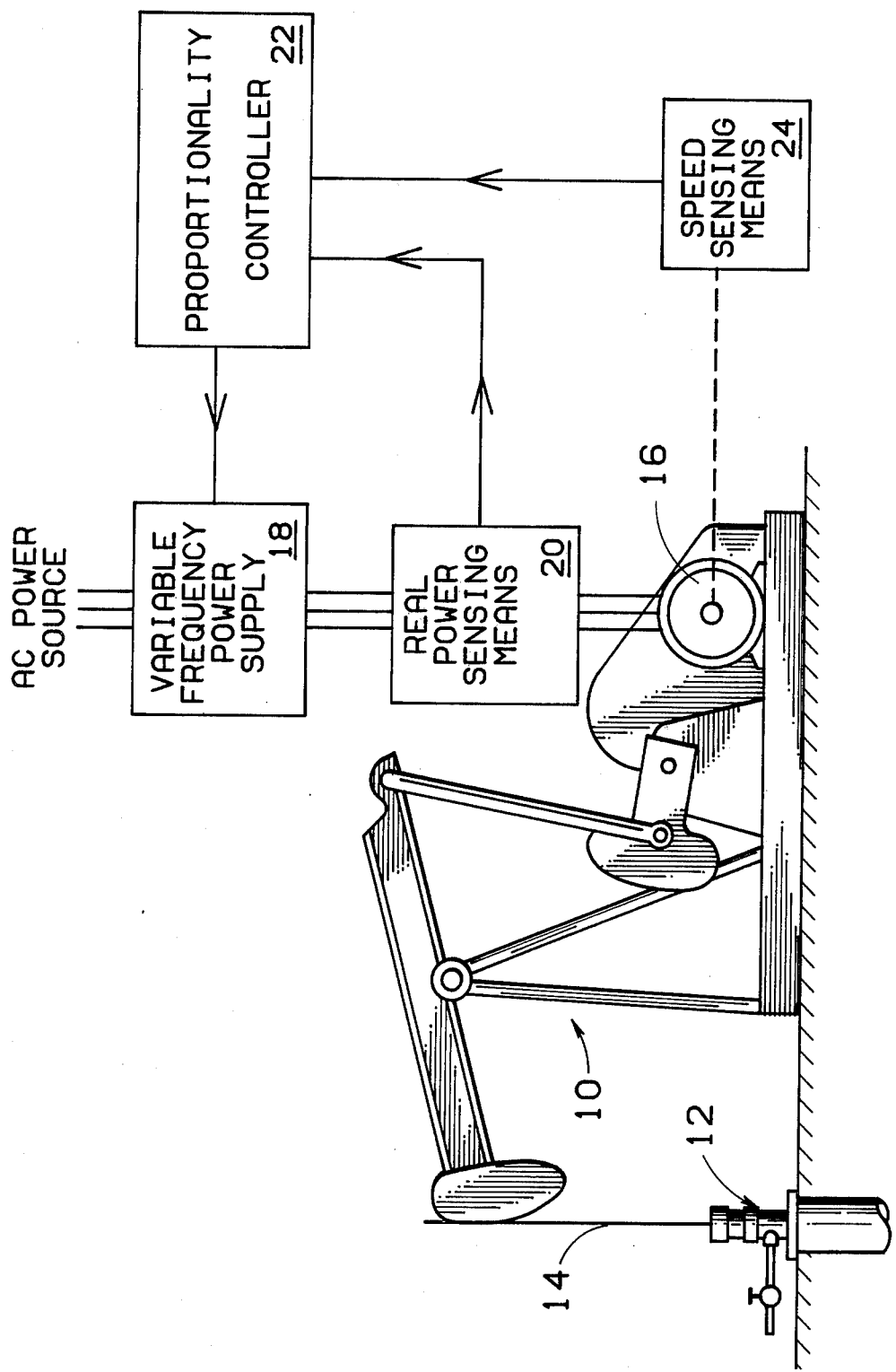
FIG. 1 shows a variable-speed beam pumping unit and a general block diagram of the control system.

This invention controls pumping speed based on real power. The power can be measured directly by motor electrical wattage measurements. FIG. 1 illustrates a beam pumping unit 10 pumping a well 12 through a polished rod 14. The power to an electric motor 16 is supplied from an AC power source through a variable frequency power supply 18. The power is monitored by the real power sensing means 20, which sends a power signal to the controller circuitry (proportional controller 22). A speed sensing means 24 also sends a signal to the proportional controller 22, which controls the output of the variable frequency power supply 18 to maintain the pumping speed proportional to the real power.

The speed sensing means 24 can sense motor speed, for example, by the use of a tachometer. As the motor, beam, polished rod, rod string, pump, and other moving parts are mechanically connected together, pumping speed is directly related to their movement and any one of a number of methods to measure speed in strokes per minute can be used. As the slip of the AC electric motor 16 is generally small, the output frequency of the variable frequency power suppy 18 can also be used. The output voltage is generally controlled in the variable frequency power supply 18 to be proportional to the output frequency and thus this voltage can also be used. Further, there are many places in the circuitry of the variable frequency supply 18 where a signal which is related to motor speed can be obtained.

Various types of power sensing means 20 can also be used to provide a signal proporational to real power. Note, however, that in a system with varying amounts of reactance, neither current nor current corrected for voltage variations nor polished rod load is proportional to real power. While other real power measurements (such as instantaneous polished rod load times instantaneous polished rod velocity) can be used, electrical power measurements are easiest and are preferred. Direct measurements of pump power are generally impractical; however, the input power to the motor (the output power of the variable frequency power supply) is indicative of pump power and can easily be measured. These AC motors are typically three-phase and three-phase electrical power can, of course, be measured in a three-phase, three-wire circuit by summing of the wattage indications of two wattmeters, each being connected to measure the current in one of the three lines and the voltage between that line and the third line (the line whose current is not sensed). As the motor 16 is generally a balanced load, the power can also be calculated using a single wattmeter. Thus, for example, the power is three times the wattmeter indication given from one of the phase currents and the voltage between that line and the neutral of a four-wire circuit (a "Y" box can, of course, be used to provide a neutral connection in a three-wire circuit).

Semiconductor circuits which can function as a wattmeter are known in the art (see, for example, U.S. Pat. No. 3,152,250, issued Oct. 6, 1954, and U.S. Pat. No. 3,197,626, issued July 27, 1965). Because the output waveform of a variable frequency power supply is generally not a sine wave, semiconductor RMS wattmeters such as described in U.S. Pat. No. 3,590,316, issued to Engel and Elms on June 29, 1971 (portions of which are further explained in U.S. Pat. No. 3,743,949, issued to the same inventors in July 3, 1973), are preferred as they provide a very inexpensive and practical arrangement for accurately measuring the wattage. Again, the power signal can either be calculated from the output of a single such transistorized wattmeter (assuming the load is balanced) or two such transistorized wattmeters can be connected as described above and their outputs algebraically combined to measure the wattage of a three-phase system.

Figure 2:
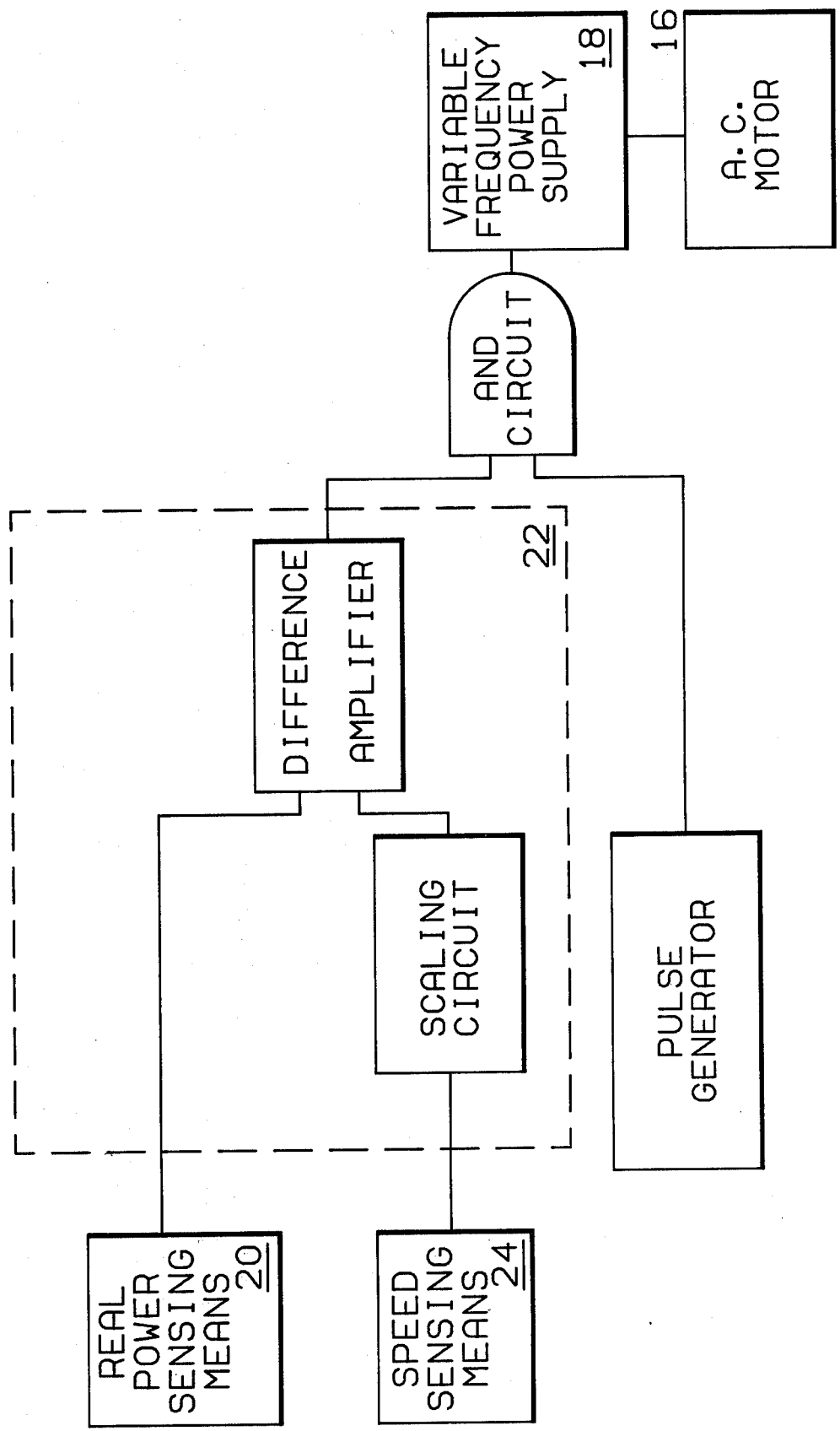
FIG. 2 is a block diagram of an embodiment of the control circuitry.

FIG. 2 is a block diagram of an embodiment of the control circuitry. The signal from the speed sensing means 24 is run through a scaling circuit to establish the proportionality constant. The output of the scaling circuit and the signal from the power sensing means 20 are run to the difference amplifier. Whenever the power signal equals the speed signal times the proportionality constant, there is no error and the output of the difference amplifier will be zero and the frequency of the variable-frequency power supply will remain unchanged. If the two inputs to the difference amplifier are not the same, there will be an error signal out of the difference amplifier. In order to prevent overcontrolling, the error signal is blocked most of the time by an AND circuit. The AND circuit will only couple the error signal to (and thereby change the frequency of) the variable frequency power supply 18 when a pulse is received from the pulse generator.

Figure 3:
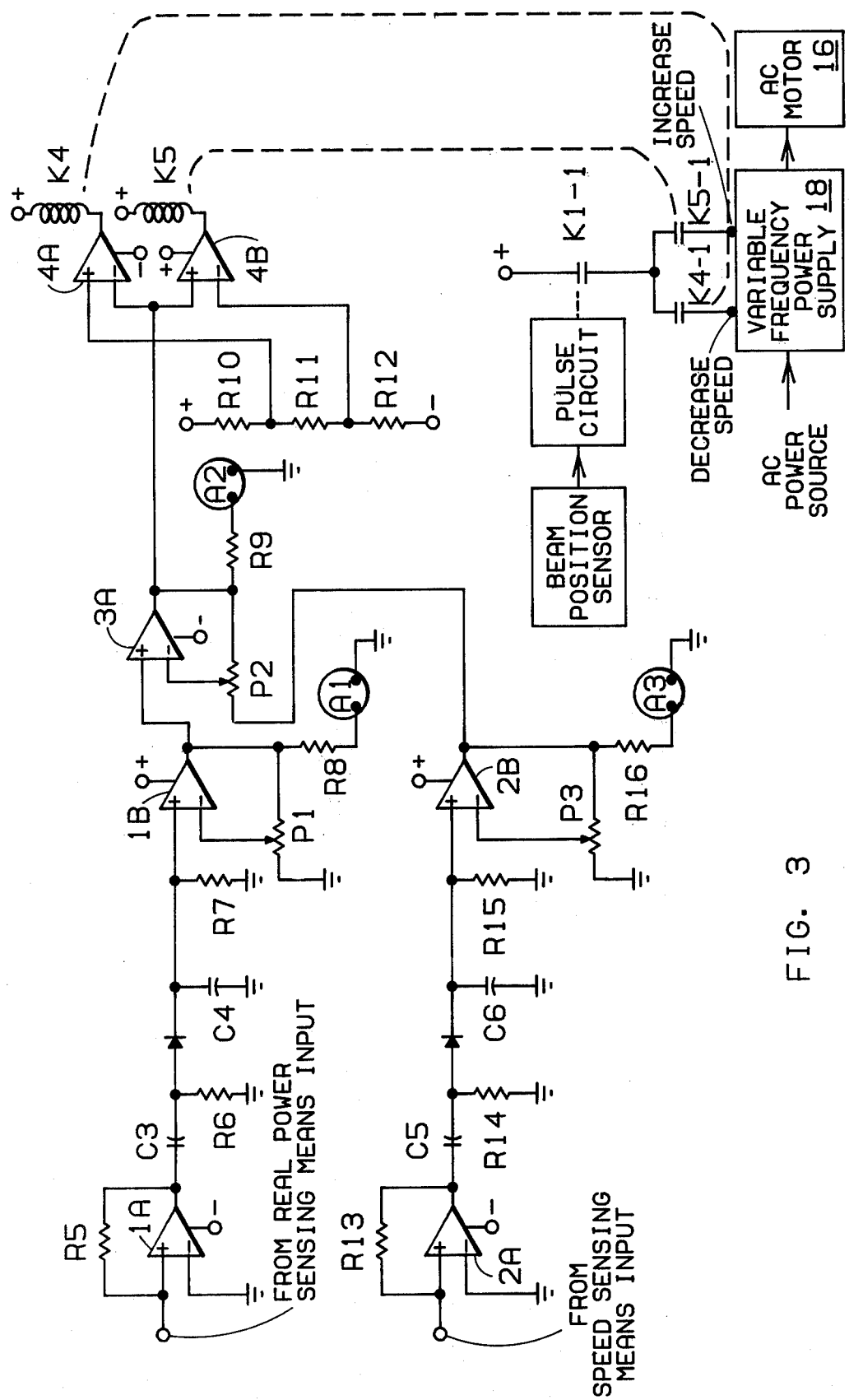
FIG. 3 is a diagram generally in electrical schematic form, showing one implementation of the block diagram of FIG. 2.

FIG. 3 generally shows the embodiment of FIG. 2, an electrical schematic. Such a control system could, of course, alternately be implemented in different forms, such as electromechanical or pneumatic. Table I below gives typical component values for the components in FIG. 3.

TABLE I

| | |
|---|---|
| R5 | 10K |
| R6 | 10K |
| R7 | 50K |
| R8 | 820K |
| R9 | 270K |

TABLE I-continued

| | |
|---|---|
| R10 | 270K |
| R11 | 36K |
| R12 | 270K |
| R13 | 10K |
| R14 | 10K |
| R15 | 50K |
| R16 | 820K |
| C3 | .01 mfd |
| C4 | 30 mfd |
| C5 | .01 mfd |
| C6 | 30 mfd |
| P1 | 10K |
| P2 | 25K |
| P3 | 10K |
| A1,A2,A3 | 0-200 microamps |
| 1A-1B, 2A-2B | Raytheon 4558 |
| 3A and 4A-4B | Raytheon 4558 |

Generally, operational amplifiers 1A and 1B and their associated circuitry provide signal conditioning and calibration for the signal from the real power sensing means. Potentiometer P1 can be used to calibrate microammeter A1 to indicate the power in some convenient units (e.g., watts). Similarly, operational amplifiers 2A and 2B condition the speed sensing signal and P3 potentiometer is used to calibrate microammeter A3 in appropriate units (e.g., strokes per minute or RPM). Operational amplifier 3A provides the difference amplifier and potentiometer P2 provides a means for calibrating the scaling circuit. Microammeter A2 provides an indication of the error signal coming out of the difference amplifier. In this configuration, operational amplifiers 4A and 4B are provided to give a dead band and avoid unnecessary changes of speed as could be caused by minor deviations. The pulse generator provides a constant width pulse each time it is activated by the beam position sensor and the beam position sensor is activated once per pump stroke cycle (for example, each time the pump reaches the top of the upstroke). The AND circuit is provided by contact K1-1 which must be closed in addition to the contacts of one of the speed adjusting relays (relays K4 and K5) before a signal to adjust the speed is sent to the variable frequency power supply 18. As noted above, this AND circuit avoids overcontrolling.

As the power varies throughout the stroke, there tends to be some variation even in a filtered power signal during the stroke. Possible oscillation is avoided if each pulse occurs at the same point in each stroke cycle. Thus, as the speed is changed, the time between corrections is changed proportionally. This can also be done, for example, by electronically proportionally changing the delay between pulses with speed rather than the position sensor on the beam pumping unit which synchronizes the pulse to some point in the stroke cycle as described above.

If, for example, the flow rate of fluid flowing into the well-bore decreased, the head in the well would drop and the power signal would increase slightly and the error signal out of operational amplifier 3A would actuate operational amplifier 4B (once the error signal became large enough to exceed the dead band). K4 would energize and its contact K4-1 would close. When the pulse generator energizes relay K1 (here, a 100-ms pulse), a reduce speed signal will be sent to the variable frequency power supply 18. The frequency of the variable frequency power supply 18 will be reduced and the speed of the down-hole pump will be slowed.

Conversely, if the flow rate into the borehole increases, the power signal will decrease. When the dead band is exceeded, operational amplifier 4A will energize relay K5 and, when contact K1-1 is energized, the frequency of the variable frequency power supply 18 will be increased slightly to increase the speed of the downhole pump. In either case, the speed will be adjusted to reestablish the predetermined proportionality between the real power and the speed (the proportionality constant being determined directly by setting of the wiper of potentiometer P2).

An appropriate proportionality constant can be determined in a number of manners. It could be calculated for a particular well configuration from the volume of fluid pumped per stroke, the number of strokes per minute, and pump efficiency. It is more practicaly, however, to pump each well down at some predetermined speed and monitor the power as the well pumps down. As the time when the well becomes pumped off can be determined (in any one of a number of known methods) the proportionality between power and speed can easily be determined and set for a point before pump-off to establish the proportionality for that particular well.

Care should generally be taken to avoid selecting a set point too close to pump off. At a given speed the pump power increases as the level in the borehole decreases until the level falls to a point where there is inadequate fluid, after which point the pumping power starts to decrease. If the well has too little fluid, the power/speed ratio can be below the set point, and with just the basic control, the system would erroneously call for increased speed, when pumping actually should be slowed. Thus, one must either avoid the pumped off condition or include additional controls to recogize the pumped off condition (e.g., by use of a conventional pumpoff controller as a backup or by logic circuitry to recognize that an increase in speed produces a decrease in power consumption) and override the basic contol to reduce speed and restore the well to a nonpumped off condition.

Variable speed power supplies are commercially available. In these the frequency can be adjusted automatically in response to an electrical signal. The voltage in such units is, of course, adjusted as the frequency is changed to remain proportional to the frequency. The use of a frequency changer (variable frequency power supply) is described, for example, in U.S. Pat. No. 3,568,771, issued to Vincent and Drake on Mar. 9, 1971. A variable frequency (and voltage) power supply can also be obtained by connecting AC power into a variable voltage rectifier and connecting the rectifier output to a variable frequency inverter. A variable frequency inverter is described, for example, in U.S. Pat. No. 3,860,858, issued to Nola on Jan. 14, 1975. While variable speed power supplies generally do not have a sine wave output, the power lost as a result of the wave shape not being sinusoidal is not excessive (as low as about 5%).

As an alternate to a power signal being generated from the electrical power supplied to the motor, a signal which is indicative to pump power can also be generated by multiplying the polished rod load by the polished rod velocity on an instantaneous basis. This provides an instantaneous power signal which can be averaged to provide the power signal and can be done with the RMS circuit of the aforementioned U.S. Pat. No. 3,590,316. Note that polish rod load (without rod velocity) does not give a signal proportional to power in a variable-speed system. Note also that the motor wattage system described above is more straightforward and is preferred.

It can be seen that this variable pumping speed control system for a beam pumping unit allows the AC motor to actuate the pump at an appropriate speed for the amount of flow entering the wellbore at any particular time. It may be noted that the power is a function of flow and that an accurate measure of flow would provide a signal equivalent to the real power signal. Because of the difficulties of measuring flow (partly due to the abrasive particles contained in the fluid, but primarily due to the water and gas generally produced with the oil) such flow measurements are generally impractical, while, as can be seen from the foregoing, the power can be conveniently and accurately measured.

The invention is not to be construed as limited to the particular embodiments described herein, since these are to be regarded as illustrative rather than restrictive. The invention is intended to cover all configurations which do not depart from the spirit and scope thereof.

I claim:

1. A variable pumping speed control system for a beam pumping unit in which a down-hole pump is actuated by a rod string driven by an AC motor, said system comprising:
   (a) means for generating a signal indicative of real power supplied to the pump;
   (b) means for generating a signal which is a function of pumping speed;
   (c) a variable frequency power supply having a signal input, a power input and a power output, said power input being connectable to a source of AC power, and said power output adapted to be connected to said AC motor; and
   (d) control circuitry having inputs adapted to receive said real power signal and said speed signal and an output connected to said signal input of said variable frequency power supply, said control circuitry being adapted to vary the output of said variable frequency power supply to maintain said speed signal essentially directly proportional to said real power signal.

2. The control system of claim 1, wherein said real power sensing means comprises a wattmeter connected to sense power supplied to said AC motor.

3. In combination with a beam pumping unit of the type wherein an AC motor mechanically actuates a pump by means of a rod string, the improvement comprising:
   (a) real power sensing means;
   (b) speed sensing means;
   (c) a variable frequency power supply having a signal input, a power input, and an output, with said power input being connectable to an AC power line and said output being connected to said AC motor; and
   (d) controller circuitry having inputs connected to said real power sensing means and said speed sensing means and an output connected to said variable frequency power supply signal input, said circuitry being adapted to generate an output signal to cause said variable frequency power supply to vary its output frequency to maintain pumping speed essentially directly proportional to the real power of said pump.

4. The combination of claim 3, wherein said real power sensing means is a semiconductor wattmeter, which monitors the output of said variable frequency power supply.

5. A method of operating a beam pumping unit driven by an AC motor, said method comprising:
   (a) generating a signal which is a function of the real power of said pump;
   (b) generating a signal which is a function of pumping speed;
   (c) comparing said real power signal and said speed signal and generating a speed demand signal adapted to maintain the speed of said beam pumping unit essentially directly proportional to said real power signal;
   (d) controlling the frequency of a variable frequency power supply in response to said speed demand signal; and
   (e) supplying the output of said variable frequency power supply to said AC motor.

* * * * *